United States Patent
Yamanouchi et al.

(10) Patent No.: US 11,390,195 B2
(45) Date of Patent: Jul. 19, 2022

(54) VEHICLE SEAT

(71) Applicant: Toyota Jidosha Kabushiki Kaisha, Toyota (JP)

(72) Inventors: Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/909,208

(22) Filed: Jun. 23, 2020

(65) Prior Publication Data

US 2020/0406793 A1 Dec. 31, 2020

(30) Foreign Application Priority Data

Jun. 28, 2019 (JP) .............................. JP2019-121598

(51) Int. Cl.
*B60N 2/30* (2006.01)
*B60N 2/01* (2006.01)
*B60N 2/24* (2006.01)
*B60J 1/08* (2006.01)

(52) U.S. Cl.
CPC ........... *B60N 2/3036* (2013.01); *B60N 2/012* (2013.01); *B60N 2/242* (2013.01); *B60N 2/3011* (2013.01); *B60N 2/3043* (2013.01); *B60J 1/08* (2013.01)

(58) Field of Classification Search
CPC .......... B60N 2/242; B60N 2/30; B60N 2/305; B60N 2/012; B60N 2/3011; B60N 2/3036; B60N 2/3043
USPC ................................................. 296/66, 65.09
See application file for complete search history.

(56) References Cited

U.S. PATENT DOCUMENTS

| | | | | |
|---|---|---|---|---|
| 1,698,036 A * | 1/1929 | Trammell | ................. | A47C 9/06 297/14 |
| 4,527,828 A * | 7/1985 | Groce | .................. | B60N 2/3031 296/63 |
| 4,740,030 A * | 4/1988 | Nordskog | ................. | A47C 9/06 297/13 |
| 5,797,649 A * | 8/1998 | Snell, Jr. | ............... | B60N 2/3043 296/63 |
| 5,984,397 A * | 11/1999 | Dawson | ............... | B60N 2/2222 296/65.09 |
| 9,821,696 B1 * | 11/2017 | Logan, Jr. | ............... | B60N 3/023 |
| 2011/0140499 A1 * | 6/2011 | Masters | .................. | B60N 2/242 297/440.1 |
| 2012/0043795 A1 * | 2/2012 | Sap | ...................... | B60N 2/3045 297/335 |
| 2013/0088060 A1 * | 4/2013 | de Bijl | ................. | B60N 2/3043 297/311 |
| 2013/0161993 A1 * | 6/2013 | Otsuka | .................. | B60N 2/3043 297/354.12 |
| 2013/0175818 A1 * | 7/2013 | Bates | ........................ | B60P 7/02 296/10 |
| 2013/0241257 A1 * | 9/2013 | Miyazawa | ......... | B60N 2/01583 297/314 |
| 2019/0023330 A1 * | 1/2019 | McKinney | ........... | B62D 33/023 |

FOREIGN PATENT DOCUMENTS

JP H05-112168 A 5/1993
JP 2013-252757 A 12/2013

* cited by examiner

*Primary Examiner* — Jason S Morrow
(74) *Attorney, Agent, or Firm* — Dinsmore & Shohl LLP

(57) ABSTRACT

A vehicle seat is fixed to a B pillar disposed in front of a door provided on a side surface of a vehicle, and constructed to be foldable.

8 Claims, 5 Drawing Sheets

VEHICLE SEAT

CROSS REFERENCE TO RELATED APPLICATION

This application claims priority to Japanese Patent Application No. 2019-121598 filed on Jun. 28, 2019, which is incorporated herein by reference in its entirety including the specification, claims, drawings, and abstract.

TECHNICAL FIELD

The present disclosure relates to a foldable seat for a vehicle.

BACKGROUND

JP 2013-252757 A discloses a tour attendant seat which can be folded and stored in a recess provided on an aisle side of a partition wall dividing a driver seat and an aisle.

SUMMARY

Because the tour attendant seat disclosed in JP 2013-252757 A is provided on the partition wall for dividing a driver seat and an aisle, it cannot be mounted on a vehicle with no partition walls. In addition, for use in a vehicle cabin, the seat must be provided so as to minimize effects on a person's getting in and out of the vehicle.

In view of the above, an object of the present disclosure is to provide a vehicle seat capable of minimizing effects on getting in and out of a vehicle.

A vehicle seat according to the present disclosure is fixed to a B pillar disposed in front of a door provided on a side surface of a vehicle, and is constructed to be foldable.

By thus constructing a vehicle seat fixed to a B pillar to be foldable, there can be provided a vehicle seat capable of minimizing effects on getting in and out of a vehicle.

In one embodiment of the present disclosure, the vehicle seat includes a seat portion and a seat back portion, and, when folded, the seat portion and the seat back portion may stick to a side surface of the B pillar so that the seat portion and the seat back portion are substantially parallel to the side surface of the B pillar.

According to this embodiment, the seat portion and the seat back portion stick to the side surface of the B pillar in a substantially parallel manner when folded, thereby minimizing effects on getting in and out of a vehicle when the seat is folded.

In one embodiment of the present disclosure, when folded, a length of the vehicle seat in a front-back direction may be equivalent to or smaller than a length of the B pillar in the front-back direction.

According to this embodiment, the vehicle seat does not block passage to an opening of the door when folded, thereby minimizing effects on getting in and out of the vehicle.

In one embodiment of the present disclosure, a transparent window may be provided on the side surface of the vehicle in front of the B pillar.

According to this embodiment, a person sitting on the vehicle seat can see the outside of the vehicle, so that the person can easily see another person getting in and out of the vehicle.

The present disclosure can provide a vehicle seat capable of minimizing effects on getting in and out of a vehicle.

BRIEF DESCRIPTION OF DRAWINGS

Embodiments of the present disclosure will be described based on the following figures, wherein.

DESCRIPTION OF EMBODIMENTS

Figure 1:
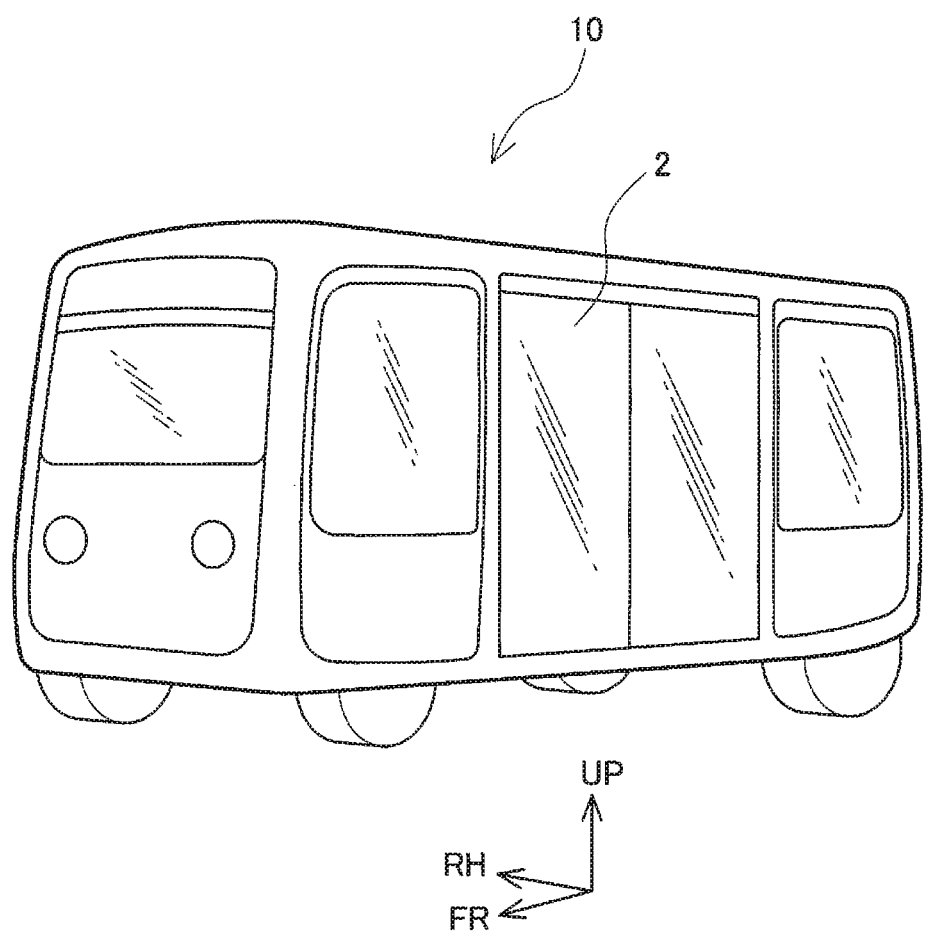
FIG. 1 is a perspective view of a vehicle provided with a vehicle seat according to an embodiment of the present disclosure.

A vehicle seat 1 according to an embodiment of the present disclosure will now be described with reference to the drawings. Arrows FR, UP, and RH in the drawings indicate forward (traveling direction), upward, and rightward directions, respectively, of a vehicle. Directions opposite to the arrows FR, UP, and RH, indicate backward, downward, and leftward directions, respectively, of the vehicle. In the following description, unless otherwise specified, expressions using the words front-back, right-left, and up-down directions refer to front-back as in the longitudinal direction, right-left in the right-left direction (width direction), and up-down in the vertical direction, of the vehicle, respectively.

Figure 2:
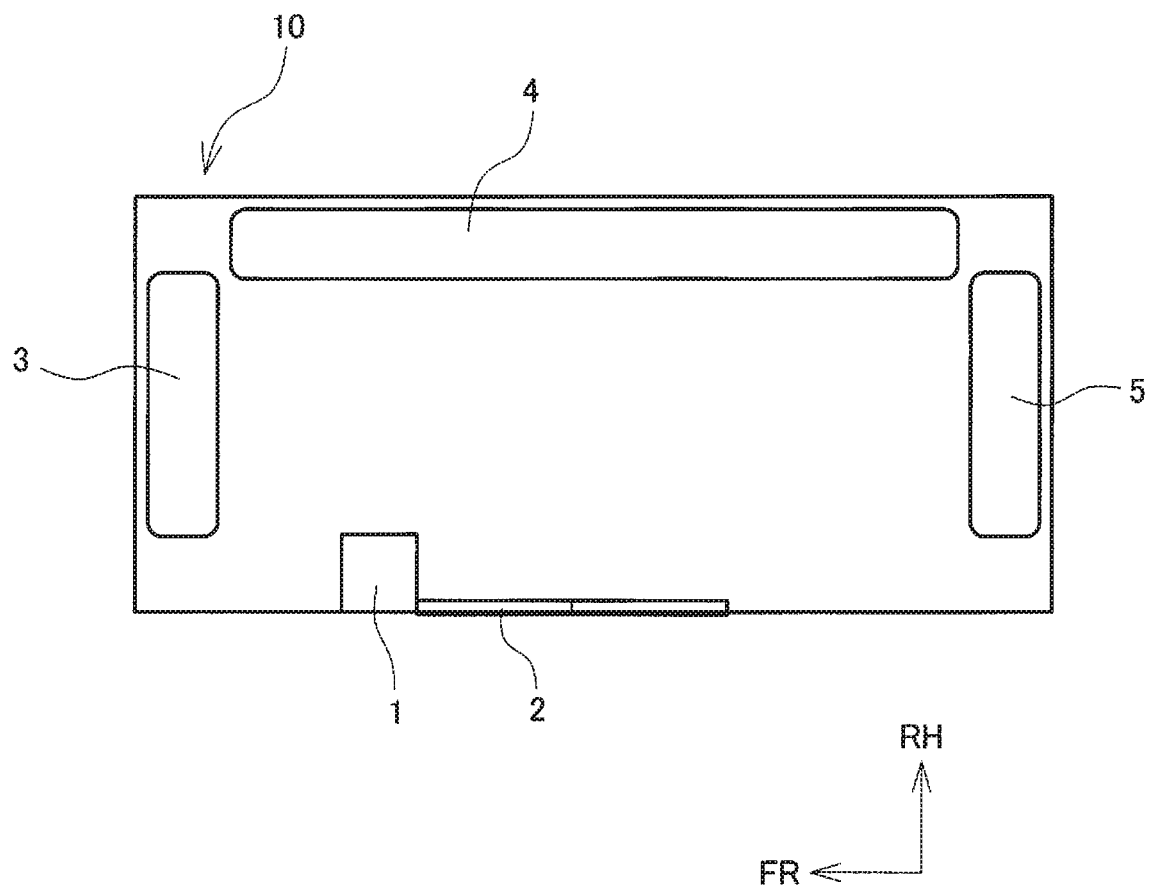
FIG. 2 is a plan view showing how seats are disposed in the vehicle provided with the vehicle seat according to the present embodiment.

As shown in FIGS. 1 and 2, on a left side surface of a vehicle 10 provided with the vehicle seat 1, a door 2 is provided for a person to get in and out of the vehicle. Referring to FIG. 2, in a vehicle cabin, the vehicle seat 1 is provided in front of the door 2 of the vehicle 10. Inside the cabin of the vehicle 10, a front seat 3, a right seat 4, and a rear seat 5 are disposed in addition to the vehicle seat 1. An occupant can sit facing rearward on the front seat 3, facing to the left on the right seat, or facing forward on the rear seat.

While the vehicle 10 can be automatically driven, an operator may sit on the vehicle seat 1 to perform operations such as starting or stopping the vehicle 10, and opening or closing the door 2. The vehicle seat 1 is constructed to be foldable, so that it is used when the operator is aboard the vehicle 10, and unused and folded when no operator is aboard the vehicle 10 which is being driven automatically.

Figure 3:
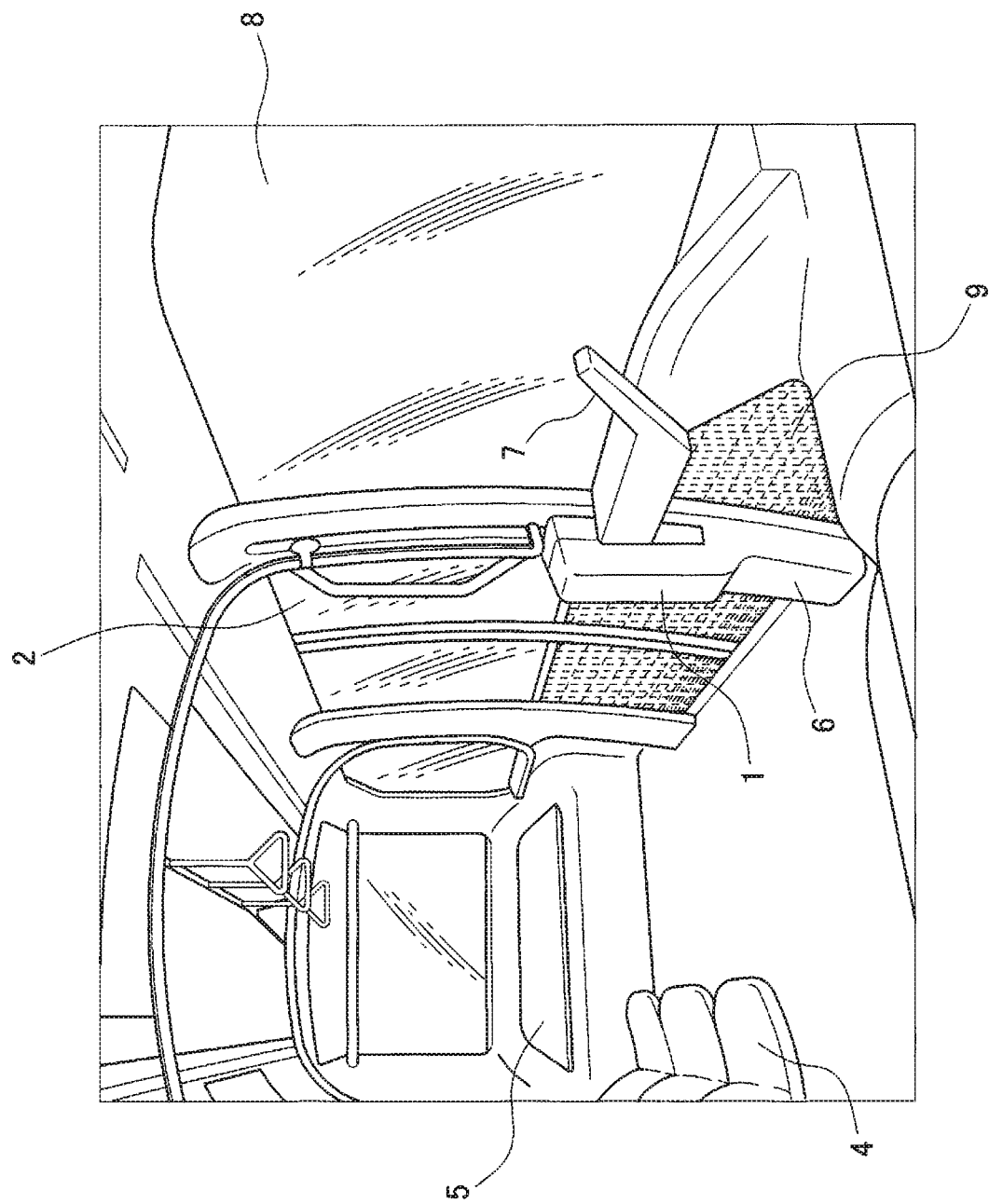
FIG. 3 is a perspective view of an interior of the vehicle provided with the vehicle seat according to the present embodiment.

As shown in FIG. 3, the vehicle seat 1 is fixed to a B pillar 6 disposed in front of the door 2. FIG. 3 shows the vehicle seat 1 in a folded state. A touch panel 7 is provided on a sloped surface disposed in front of the B pillar 6. The operator sits on the vehicle seat 1 and touches the touch panel 7 so as to operate the vehicle 10.

Figure 4:
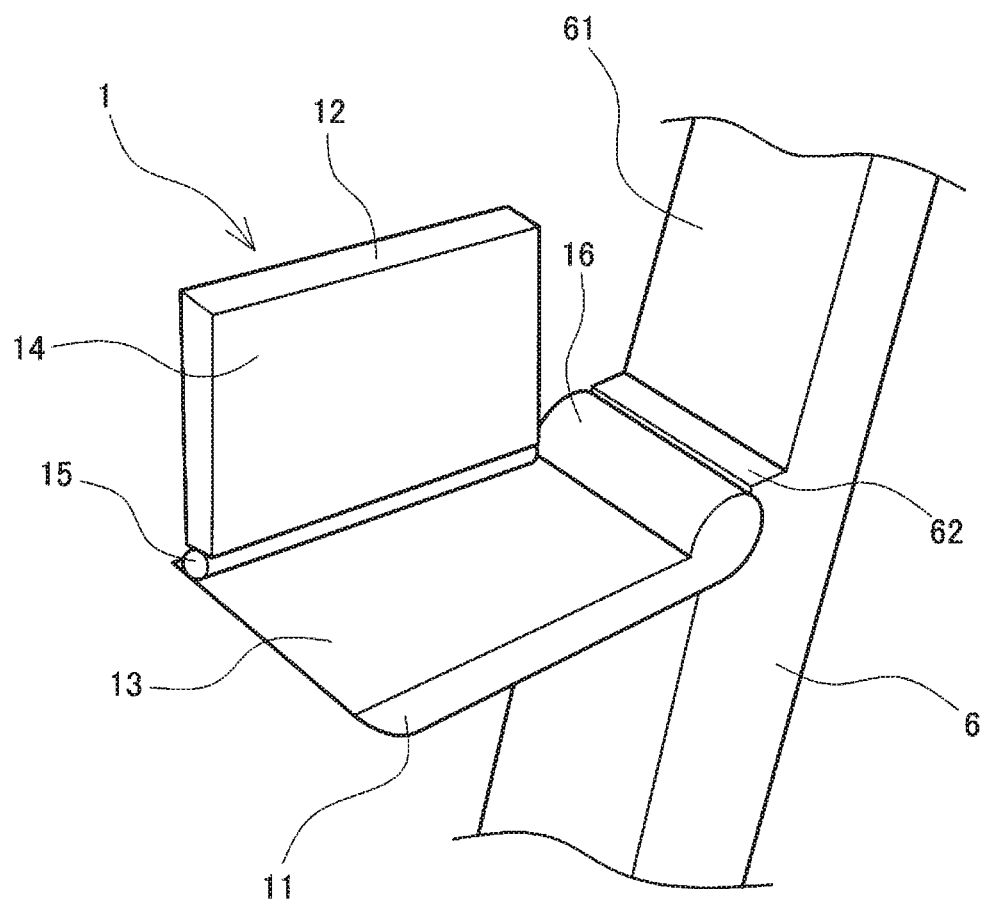
FIG. 4 is a perspective view of the vehicle seat in use according to the present embodiment.

As shown in FIG. 4, the vehicle seat 1 includes a seat portion 11 and a seat back portion 12. A seat surface 13 is provided on the upper side of the seat portion 11, and a seat back surface 14 is provided on the front side of the seat back portion 12. The operator can sit on the seat surface 13 of the seat portion 11, facing in the forward direction. The seat back portion 12 is pivotably mounted to a rear part of the seat portion 11 to pivot around a rotation axis 15. The seat portion 12 can rotate, around the rotation axis 15, from an angle at which the seat back surface 14 is substantially vertical to the seat surface 13 as shown in FIG. 4 to an angle at which the seat back surface 14 comes into contact with the seat surface 13. In addition, a rotation axis 16 is provided on the left side of the seat back portion 11 so that the seat portion 11 is pivotably mounted to the B pillar 6 around the rotation axis 16. As shown in FIG. 4, the seat portion 11 can rotate, around the rotation axis 16, from an angle at which the seat surface 13 is substantially vertical to a side surface 61 of the B pillar 6 located on the inner side in the width direction of the vehicle to an angle at which the seat surface 13 is parallel to the side surface 61 of the B pillar 6. A step 62 is provided in the B pillar 6 on the inner side in the width direction of the vehicle so that the thickness of the B pillar 6 in the width direction of the vehicle is reduced at the portion higher than the step 62 as compared with the thickness at the portion lower than the step 62.

To fold the vehicle seat 1, the seat back portion 12 is rotated, from the state shown in FIG. 4, until the seat back surface 14 comes into contact with the seat surface 13. By thus rotating the seat back portion 12, the seat portion 11 and the seat back portion 12 overlap each other in the up-down direction. The seat portion 11 is rotated toward the side surface 61 of the B pillar 6 around the rotation axis 16 with the seat portion 11 and the seat back portion 12 overlapping each other, thereby putting the vehicle seat 1 in a folded state as shown in FIG. 5.

Figure 5:
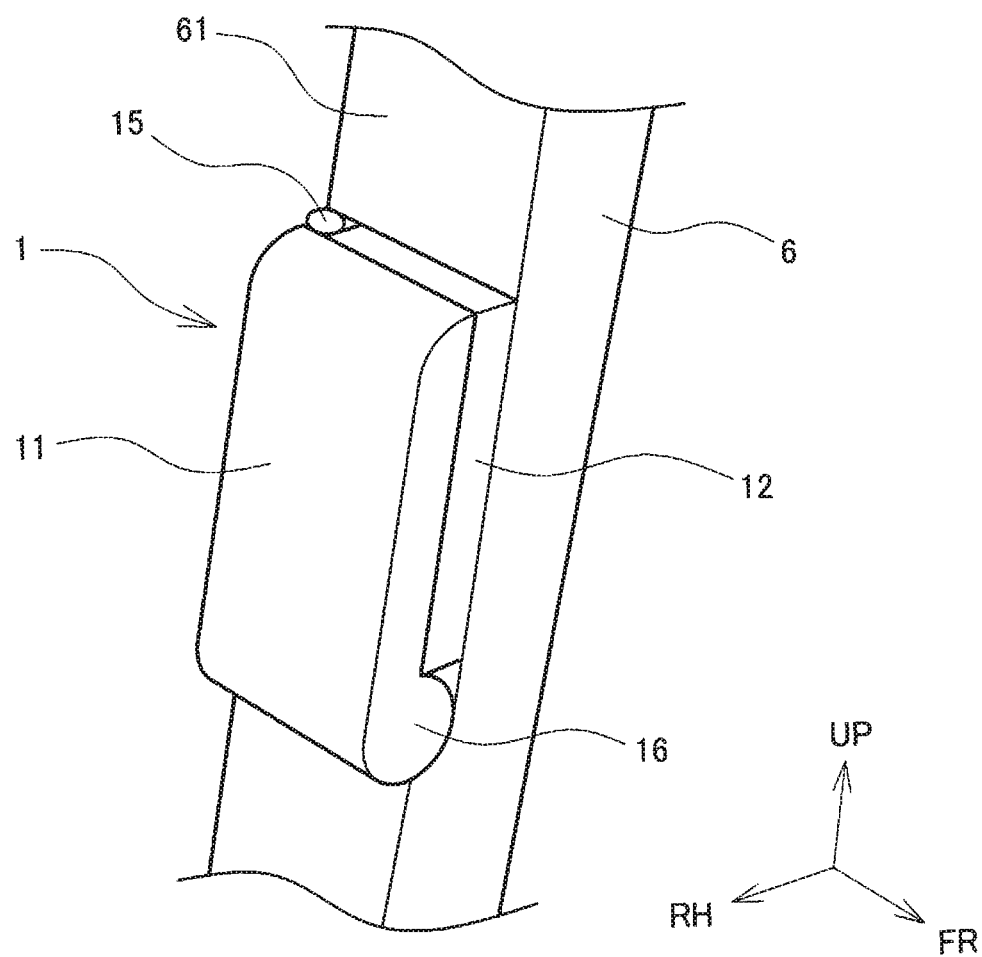
FIG. 5 is a perspective view of the vehicle seat in a folded state according to the present embodiment.

When the vehicle seat 1 is folded, the seat portion 11 and the seat back portion 12 stick to the side surface 61 of the B pillar 6 so that these portions are placed parallel to the side surface 61 as shown in FIG. 5. Note that the word "stick" refers not only to the state where these portions come into contact with the side surface 61 without any gap, but also to the state where they are placed opposite to the side surface 61 forming a gap between the side surface 61 and these portions. When the vehicle seat 1 is thus folded, part of the vehicle seat 1 is stored in a portion where the thickness of the B pillar 6 in the vehicle width direction is reduced above the step 62. By thus providing the step 62 on the inner side of the B pillar 6 in the vehicle width direction, and storing part of the vehicle seat 1 in the portion where the B pillar 6 is reduced in thickness in the vehicle width direction with use of the step 62, the vehicle seat 1 can be less protruded toward the inside of the cabin when stored. The B pillar 6 may have a recess on the inner side in the vehicle width direction such that the thickness of a central part in the up-down direction is reduced in the vehicle width direction rather than having different thicknesses in the vehicle width direction at the portions higher and lower than the step 62. When such a recess is provided, part of the vehicle seat 1 is stored in the recess when the seat 1 is folded, so that the vehicle seat 1 can be less protruded toward the inside of the cabin when stored.

When the vehicle seat 1 is folded, the length of the seat 1 in the front-back direction of the vehicle seat 1 is equivalent to or smaller than the length of the B pillar 6 in the front-back direction, as illustrated in FIG. 5. Note that such length also includes a length larger than that of the B pillar 6 in front-back direction to such an extent as to ensure that passage to the opening of the door 2 is not blocked. Thus, the vehicle seat 1 is folded so that the seat portion 11 and the seat back portion 12 stick to the side surface 61 of the B pillar 6, and the folded vehicle seat 1 does not block passage to the opening of the door 2, thereby minimizing effects on getting in and out of the vehicle when the vehicle seat 1 is folded.

As shown in FIG. 3, on the side surface of the vehicle, an upper transparent window 8 and a lower transparent window 9 having a dotted pattern are disposed in front of the B pillar 6. An operator sitting on the vehicle seat 1 can see the outside of the vehicle 10 through the windows 8 and 9, thereby making it easy for the operator sitting on the vehicle seat 1 to see a person getting in and out of the vehicle.

The vehicle seat according to the present disclosure is not limited to the embodiments described above, and can be implemented in various modes within the scope of the summary of the present disclosure. For example, it may be the case that the seat having a seat portion does not include a seat back portion. The vehicle seat may be mounted to a vehicle that cannot be automatically driven. The seats other than the vehicle seat 1 may be disposed in different locations. The window 9 may have a pattern different from a dotted pattern, and may be a transparent window without any patterns.

The invention claimed is:

1. A vehicle seat, secured to a B pillar disposed in front of a door provided on a side surface of a vehicle, and constructed to be foldable, a length of the vehicle seat in a front-back direction of the vehicle when folded is equivalent to or smaller than a length of the B pillar in the front-back direction of the vehicle, wherein a seat portion and a seat back portion are provided, the seat portion and the seat back portion stick to a side surface of the B pillar when folded so that the seat portion and the seat back portion are substantially parallel to the side surface of the B pillar.

2. The vehicle seat according to claim 1, wherein
a transparent window is disposed in front of the B pillar on the side surface of the vehicle.

3. The vehicle seat according to claim 1, wherein the B pillar includes a step, and a portion of the vehicle seat is positioned on the step when the vehicle seat is folded.

4. The vehicle seat according to claim 1, wherein the seat portion is pivotally coupled to the B pillar, and the seat back portion is pivotally coupled to the seat portion.

5. The vehicle seat according to claim 4, wherein the seat portion pivots about a first rotation axis, the seat back portion pivots about a second rotation axis, and the first rotation axis is generally normal to the second rotation axis.

6. A vehicle seat, secured to a B pillar disposed in front of a door provided on a side surface of a vehicle, and constructed to be foldable, the vehicle seat includes a seat portion and a seat back portion are provided, and the seat portion and the seat back portion stick to a side surface of the B pillar when folded so that the seat portion and the seat back portion are substantially parallel to the side surface of the B pillar,
wherein the seat portion is pivotally coupled to the B pillar about a first rotation axis, and the seat back portion is pivotally coupled to the seat portion about a second rotation axis generally normal to the first rotation axis.

7. The vehicle seat according to claim 6, wherein
a transparent window is disposed in front of the B pillar on the side surface of the vehicle.

8. The vehicle seat according to claim 6, wherein the B pillar includes a step, and a portion of the vehicle seat is positioned on the step when the vehicle seat is folded.

* * * * *